US008561032B2

(12) United States Patent
Baron

(10) Patent No.: US 8,561,032 B2
(45) Date of Patent: Oct. 15, 2013

(54) VISUALIZING THREAD LIFE TIME IN ECLIPSE

(75) Inventor: Elliott Baron, Mississauga (CA)

(73) Assignee: Red Hat, Inc., Raleigh, NC (US)

( * ) Notice: Subject to any disclaimer, the term of this patent is extended or adjusted under 35 U.S.C. 154(b) by 824 days.

(21) Appl. No.: 12/612,560

(22) Filed: Nov. 4, 2009

(65) Prior Publication Data

US 2011/0107305 A1 May 5, 2011

(51) Int. Cl.
*G06F 9/44* (2006.01)
*G06F 9/445* (2006.01)

(52) U.S. Cl.
USPC .......................................... 717/128; 717/133

(58) Field of Classification Search
None
See application file for complete search history.

(56) References Cited

U.S. PATENT DOCUMENTS

| | | | |
|---|---|---|---|
| 6,972,761 B1 | 12/2005 | Cox et al. | |
| 7,539,604 B1 | 5/2009 | Stothert et al. | |
| 7,714,864 B2 | 5/2010 | Cahill et al. | |
| 2002/0116702 A1 | 8/2002 | Aptus et al. | |
| 2002/0170048 A1 | 11/2002 | Zgarba et al. | |
| 2003/0038831 A1* | 2/2003 | Engelfriet | 345/719 |
| 2003/0188187 A1 | 10/2003 | Uchida | |
| 2004/0003119 A1 | 1/2004 | Munir et al. | |
| 2005/0034106 A1* | 2/2005 | Kornerup et al. | 717/132 |
| 2006/0200799 A1 | 9/2006 | Wills et al. | |
| 2010/0017788 A1 | 1/2010 | Bronkhorst et al. | |
| 2010/0138811 A1 | 6/2010 | Jayaraman et al. | |
| 2010/0306736 A1* | 12/2010 | Bordelon et al. | 717/109 |
| 2010/0313188 A1 | 12/2010 | Asipov et al. | |
| 2011/0107298 A1 | 5/2011 | Sebastian | |
| 2011/0107313 A1 | 5/2011 | Baron | |
| 2012/0036370 A1 | 2/2012 | Lim et al. | |

OTHER PUBLICATIONS

Kapo C++, Feb. 2007, http://kapo-cpp.blogspot.com.*
Non-Final Office Action mailed Aug. 7, 2012 for U.S. Appl. No. 12/608,937.
Non-Final Office Action mailed Oct. 11, 2012 for U.S. Appl. No. 12/612,545.
Wingolog, Catching Memory Leaks with Valgrind's Massif, http://Wingolog.org/archives/2008/05/05/catching-memory-leaks-with-valgrinds-massif, May 5, 2008, 5 pages.
Kapo C++: Detecting Memory Leak, http://kapo-cpp.blogsport.com/2007/02/detecting-memory-leak.html, Feb. 25, 2007, 9 pages.

* cited by examiner

*Primary Examiner* — Hyun Nam
(74) *Attorney, Agent, or Firm* — Lowenstein Sandler LLP

(57) ABSTRACT

A computer method involving receiving by an integrated development environment component an output file from a thread tracking component, generating a Gantt chart of a thread from the output file to visualize a life of the thread, and displaying the Gantt chart to a requesting user.

20 Claims, 4 Drawing Sheets

VISUALIZING THREAD LIFE TIME IN ECLIPSE

TECHNICAL FIELD

The embodiments of the invention relate to a integrated development environment. Specifically, the embodiments of the invention relate to an integrated development environment with a thread lifetime visualization tool.

BACKGROUND

An integrated development environment (IDE) provides a set of tools such as editing and debugging software for programmers. These tools are utilized to create and to debug new software programs. The IDE supports software development by providing a windowed system for source file editing, project management, file interdependency management and debugging. ECLIPSE®, by the Eclipse Foundation, is an IDE for C and C++ development on the LINUX® platform. ECLIPSE® uses a plug-in based software model where all the components of the IDE are structured as plug-ins for the IDE.

There are many other types of programming tools that are not part of an IDE and are used on a stand-alone basis. One example of a stand-alone tool is Systemtap. Systemtap is an instrumentation system that provides a scripting language and command line interface for monitoring system performance. Systemtap can be utilized to define probes in a binary for the purpose of monitoring the execution of the binary by threads. Another example of a stand-alone profiling tool is Oprofile. Oprofile is a profiling utility for the LINUX® platform that provides another suite of profiling tools. The tools include a cache miss counter, a cache stall counter, a memory fetch counter and an additional set of profilers that can profile interrupt handlers and kernels. The tools of Systemtap and Oprofile are typically command line tools that generate simple flat output files.

BRIEF DESCRIPTION OF THE DRAWINGS

The embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least "one."

DETAILED DESCRIPTION

Figure 1:
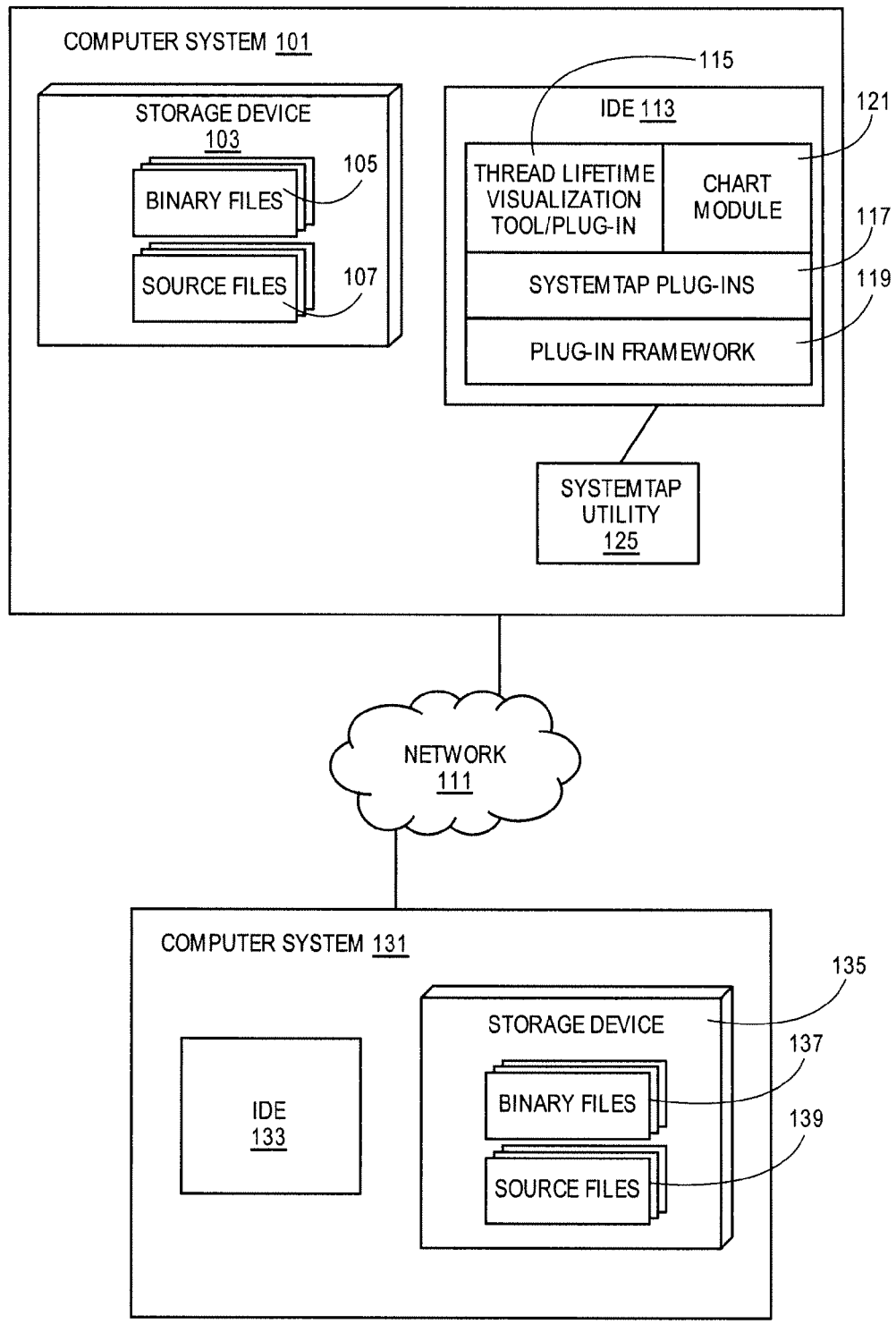
FIG. 1 is a diagram of one embodiment of a system for thread lifetime visualization in an integrated development environment.

FIG. 1 is a diagram of one embodiment of a system for thread life visualization in an integrated development environment. In one embodiment, a computer system 101 implements a thread lifetime visualization tool 121 and includes a storage device 103, an integrated development environment (IDE) 113 and a set of stand-alone utilities 125, 127. In another embodiment, the IDE 113 and the thread lifetime visualization tool are a part of a distributed system. In the distributed system embodiment, the computer system 101 communicates over a network 111 with a remote computer system 131. The distributed system can include any number of additional computer systems 131. For sake of clarity, a distributed embodiment with the single additional computer system 131 is described. One skilled in the art would understand that any number of additional computer systems could be included in a distributed system that incorporate similar features, functions and structures.

The computer system 101 can be any type of computing device including a desktop computer, a workstation, a dedicated server, a handheld device or a similar computing device. The network 111 can be a local area network (LAN), a wide are network (WAN), such as the Internet, or a similar communication system. The network 111 can include any number of intermediate computing devices and network elements between the communicating computer systems 101, 131. The network 111 can include any number or combination of wired and wireless communication mediums between the nodes in the network. Other computer systems 131 can also be any type of computing device including a desktop computer, a workstation, a dedicated server, a handheld computer system or similar computing device.

The computer system 101 can include any type and number of storage devices 103. The storage devices 103 can be fixed disk drives, removeable storage medium drives that are external or internal drives, random access memory (RAM), static memory or similar storage devices. The storage devices 103 can be used to store a set of binary files 105 and source files 107, as well as, installed programs and tools including the IDE 113 and stand-alone utilities 125, 127. The binary files 105 and source files 107 are data files that are part of a programming project managed by the IDE 113. The binary files 105 are compiled code generated from the source files 107. The source files 107 are sets of program instructions in a high level computer language like C or C++. A 'set,' as used herein refers to any positive whole number of items including one item.

The IDE 113 is an application for assisting a user in managing a software programming project. The IDE 113 assists in the management of source files 107 and binary files 105, program compiling, source file editing and similar tasks associated with software development. In one embodiment, the IDE 113 is the ECLIPSE® IDE. The IDE 113 can have a set of integrated tools or plug-ins 115. These tools 115 assist the user in debugging, editing, compiling or similarly managing the project. In one example embodiment, the tools 115 are plug-ins that operate in conjunction with a set of utility specific general purpose or intermediate plug-ins or functions 117 and a general purpose framework plug-in or component 119.

For example, the framework plug-in or component 119 can be a profiling framework for providing a set of functions relating to program execution profiling. The profiling framework can support interfacing with external utilities such as a Systemtap utility 125 or similar program. The framework plug-in or component 119 defines a set of functions that provides access to data structures and resources of the IDE to plug-ins of the IDE. A set of utility specific general purpose functions 117 for interfacing with each external program can also be defined. For example, a Systemtap specific set of functions can be provided through a plug-in 117. Sets of tools 115 can then be provided that are specific to each of the external utilities and allow the user to interface with the functionality of those external utilities within the integrated development environment 113. This set of utility specific general purpose functions 117 define functions for calling the corresponding external utilities and passing parameters such as a selected binary to the external utility. The functions return the output of the external utility to be further processed by the tools 115. These calling functions utilize the command line interfaces of the external utility and make them accessible to the tools 115.

These tools 115 can include a thread lifetime visualization tool 115 that tracks the start and end times of each of a set of threads generated to execute the user selected binary 105. The tools 115 receive a selection of a binary that a user wants to process and utilize the profiling framework 119 component and specific general purpose functions 117 to call an external utility. The profiling framework 119 and specific general purpose functions 117 return the output of the external utility. The tools 115 can then process this output data to identify the hierarchy of the data and generate a data model such as a tree model. In one embodiment, the thread lifetime visualization tool 115 includes a script that enables Systemtap to run alongside the selected binary to profile the thread lifetimes of the binary.

The specific examples of the thread lifetime visualization tool 115, Systemtap 125 utilities, the profiling framework 119, and the Systemtap general functions 117, are provided by way of example. One skilled in the art would understand that the structures, functions, and principles described in regard to these specific examples are applicable to any external utility that can be integrated and provided through a visual interface within the IDE 113, through a similar software structure, set of general function and tools. In further embodiments, the framework 119, general functions 117 and tools 115 can be integrated into a monolithic plug-in or directly integrated into the IDE 113. Other permutations of these configurations are also within the scope of the invention.

The external utilities 125 are stand-alone utilities. These external utilities 125 are command line programs for use on the LINUX® platform. The plug-ins of the IDE 113 enable the interfacing of the IDE 113 with these external utilities 125 and the utilization of the output of these utilities within the IDE 113 environment. The profile framework 119 in combination with the general functions 117, and tools 115 enable interfacing with the functionality of these external utilities 125 in the IDE 113 environment as an integrated visual experience. Further, the tools 115 may enable an integration with the source code 107 and the output of the external utilities 125. For example, the output of the utilities 125 can be displayed as a chart using a chart module 121 tool or plug-in (e.g., a Gantt chart module). In one embodiment, the tools 115 further provide the functionality that the chart can be made interactive such that a data point in the chart can be correlated with a line or set of lines in the source code 107, which then can be displayed to a user upon selection of the data point in the displayed chart.

In a distributed computing environment, a remote computer system 131 can be used to provide access to additional binary files 137 or source files 139 on the storage device 135 within the computer system 131. One of ordinary skill in the art would understand that any combination of resources can be provided over a network 111 by a computer system 131 to a user of an IDE 113 on the computer system 101. Similarly, the user of a computer system 131 and IDE 133 on that computer system 131 can interact with and utilize resources from the computer system 101 over the network 111. In this manner, the distributed computing environment enables the use of resources across the network 111 that allow a user of an IDE 113, 133 to access a larger range of resources that are distributed across each of the computer systems 101, 131.

Figure 2:
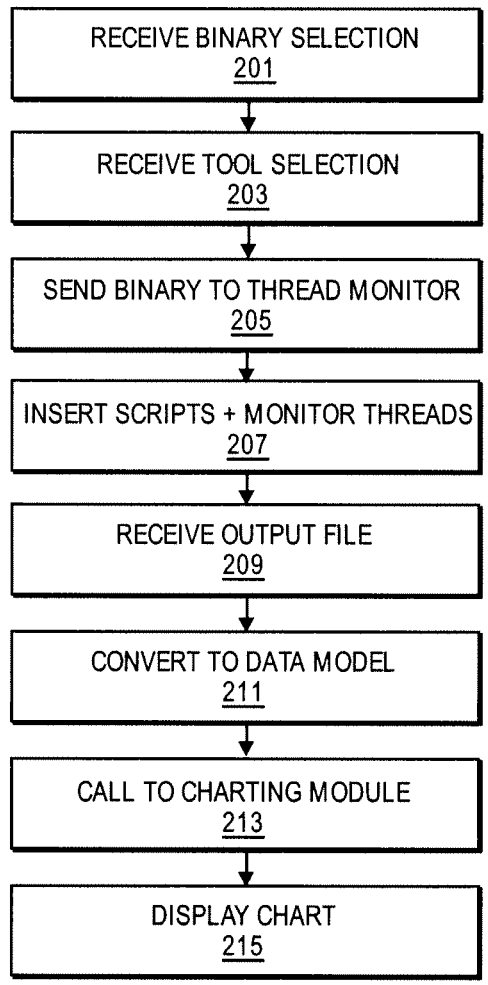
FIG. 2 is a flowchart for generating thread lifetime visualization in an integrated development environment.

FIG. 2 is a flowchart of one embodiment of the process for thread life visualization. In one embodiment, the thread life visualization process is initiated by a user of an integrated development environment selecting a binary (Block 201). The binary file is selected from those available within the current project or those available in a storage device, a computer system or a distributed network. The integrated development environment then receives a selection of the thread lifetime visualization tool (Block 203). The thread lifetime visualization tool can be selected from a menu of the integrated development environment or through similar user interface mechanism. The thread lifetime visualization tool then sends the binary file to a thread monitoring function (Block 205). The thread monitoring function can be an external stand-alone function of a utility such as Systemtap or can be an internal integrated function or utility. The thread monitoring function can be called through a function from a set of utility specific functions or through the framework. The parameters of these functions can correspond to that of the thread monitoring function such as a binary filename or similar binary identifier. These functions call the corresponding function of the external utility through a command line interface or similar interface.

The thread monitoring function of the external utility inserts a set of probes or defines a set of scripts for the binary and tracks the threads of the binary using these scripts and probes which are executed with the binary to generate information about the state of the threads to enable the tracking of the threads (Block 207). Thread tracking can include identifying a time at which each thread for a binary is created and terminated. Other thread lifetime data can also be tracked such as forking, active CPU time, stalling or similar events. This data is recorded in a file to be output or is streamed as output. The monitoring takes place during an execution of the binary by the IDE, operating system, virtual machine or similar environment. After the binary execution completes the output file is returned to the thread visualization tool through the framework and/or utility specific functions (Block 209). In one embodiment, the output file is a standard file or stream of output from an external utility such as Systemtap that is provided to the thread lifetime visualization tool as an address, pathname or similar identifier. In another embodiment, the output received and stored as internal data structure of the integrated development environment or the thread visualization tool.

The data returned by the external utility to the thread lifetime visualization tool can be converted to an internal data model (Block 211). The internal data model is utilized to make the thread data more easily managed, charted or analyzed. The internal data model is then provided to a charting module through a function call or similar process (Block 213). The internal data model can be further converted to meet the parameter requirements of the charting module. The charting module may be a Gantt charting module or similar charting module. The charting module generates a chart of each of the threads monitored by the thread monitoring utility described in the internal data model. The chart can show the start point and end point of each thread plotted over time along the x or y axis of the chart. The other axis is divided between the number of threads being monitored. The chart is then returned to the thread lifetime visualization tool which displays the chart though the integrated development environment (Block 215). The thread lifetime visualization tool can render the chart through a window or similar user interface mechanism of the integrated development environment.

Figure 3:
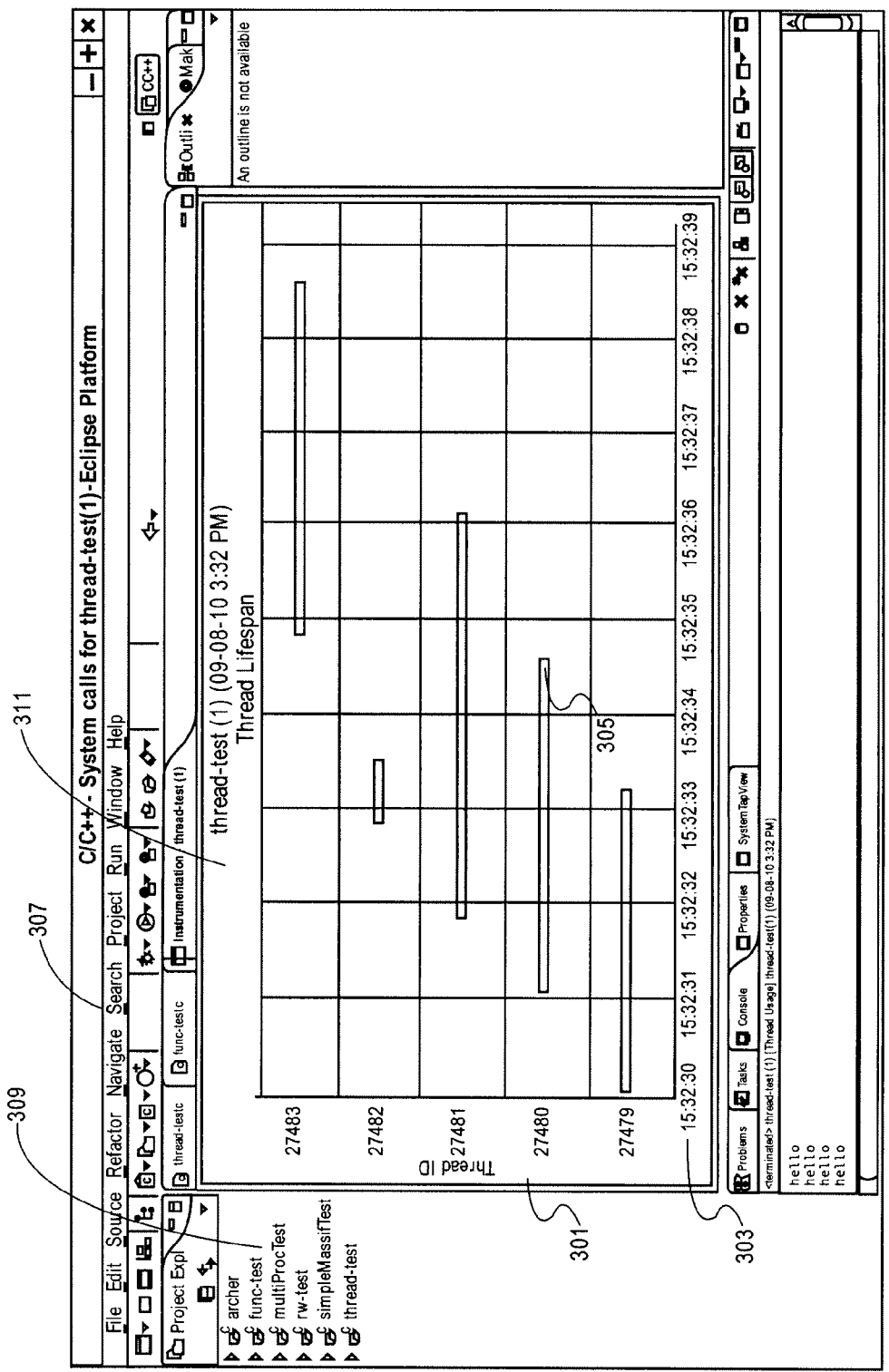
FIG. 3 is a diagram of one embodiment of a user interface for the thread lifetime visualization tool in an integrated development environment.

FIG. 3 is a diagram of one embodiment of a user interface of a thread lifetime visualization tool. The integrated development environment includes a set of user interface mechanisms 307 for selecting the different features and tools including the thread lifetime visualization tool. These user interface mechanisms can be menus, buttons or similar interface mechanisms. A project menu 309 provides an interface for viewing the tests results and files for the current project. When the thread test or similar thread monitoring option is chosen from the project menu 309 for a particular test or binary, then the chart for that binary or test is displayed through a thread lifetime visualization interface 311. A thread lifetime visualization interface 311 displays a chart of thread life spans for a particular binary.

The thread lifetime visualization interface 311 shows each of the individually tracked threads 305. Each thread is identified on the Y axis 301 with an identification number or similar descriptor. The lifespan of each thread is illustrated across the time line mapped on the X axis 303. In this manner, the start and end times of each of the threads can be viewed easily relative to the other threads to enable the viewer to understand the execution of the program. The relative life spans and overlapping life spans of the various threads generated and executed by the selected binary can be viewed enabling the user to see the interaction of the threads. In one embodiment, the displayed chart can be interactive allowing a user to select a thread or portion of a thread lifespan. In response, the thread lifetime visualization tool may display the thread code or similar associated source code.

Figure 4:
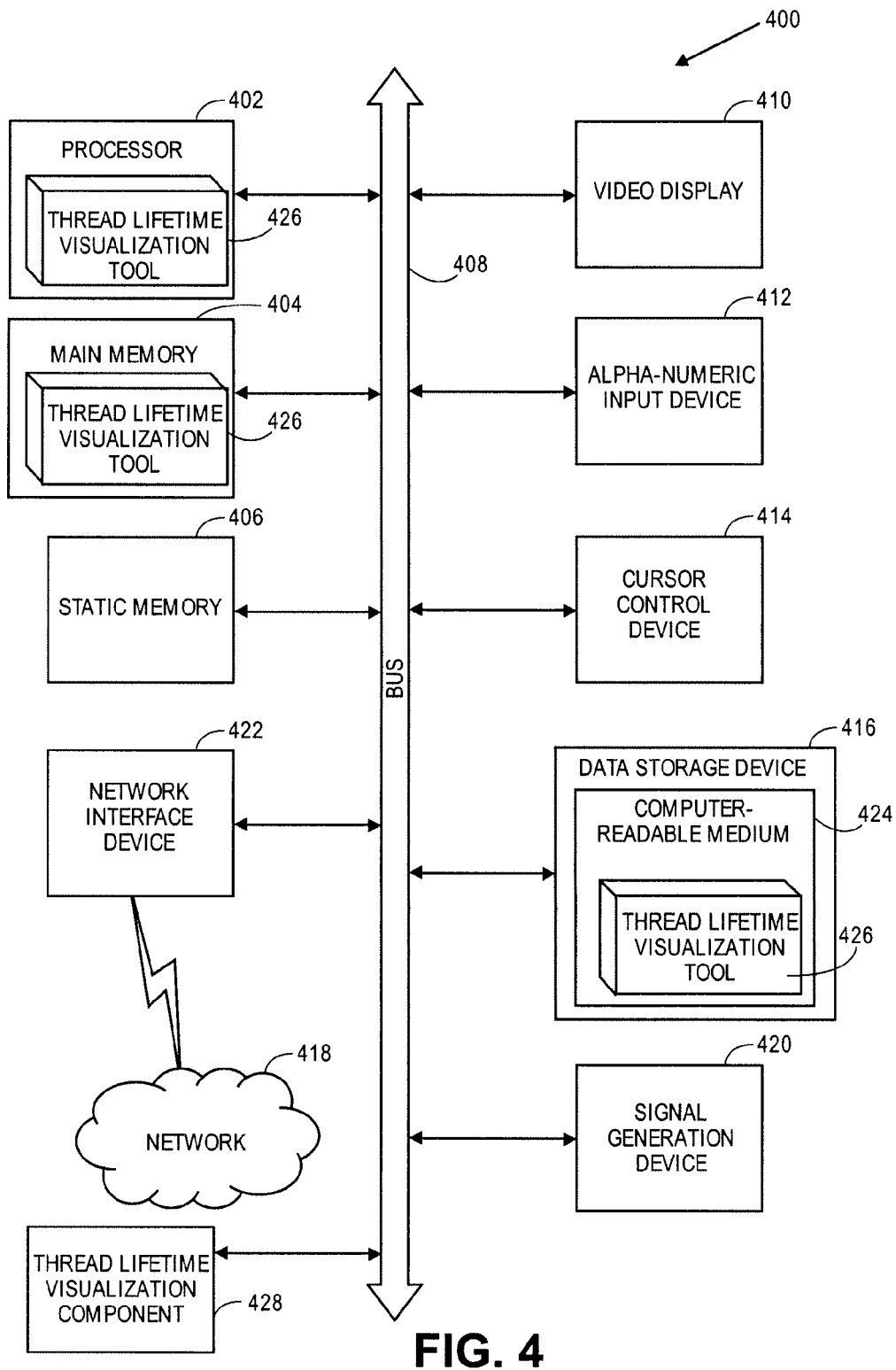
FIG. 4 is a diagram of one embodiment of a computer system implementing the thread life visualization tool.

FIG. 4 is a diagram of one embodiment of a computer system implementing the thread visualization tool. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine (e.g., a client computer executing the desktop management program and the server computer executing the a remote application) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) etc.), a static memory 406 (e.g., flash memory, static random access memory (SRAM), etc.), and a secondary memory 416 (e.g., a data storage device in the form of a drive unit, which may include fixed or removable computer-readable medium), which communicate with each other via a bus 708.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the thread lifetime visualization tool 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions (e.g., the desktop manager 426) embodying any one or more of the methodologies or functions described herein. The thread lifetime visualization tool 426 may also reside, completely or at least partially, within the main memory 404 and/or within the processing device 402 during execution thereof by the computer system 400, the main memory 404 and the processing device 402 also constituting machine-readable storage media. The thread lifetime visualization tool 426 may further be transmitted or received over a network 418 via the network interface device 422.

The machine-readable storage medium 424 may also be used to store the thread lifetime visualization tool 426 persistently. While the machine-readable storage medium 424 is shown in an exemplary embodiment to be a single medium, the term "machine-readable storage medium" and also "computer-readable storage medium" should be taken to include a single medium or multiple media (e.g., a centralized or distributed database, and/or associated caches and servers) that store the one or more sets of instructions. The terms "machine-readable storage medium" and "computer-readable storage medium" shall also be taken to include any medium that is capable of storing or encoding a set of instructions for execution by the machine and that cause the machine to perform any one or more of the methodologies of the present invention. The terms "machine-readable storage medium" and "computer-readable storage medium" shall accordingly be taken to include, but not be limited to, solid-state memories, and optical and magnetic media.

The thread lifetime visualization tool 426 can also be a discrete component 428 that performs the functions described herein. The thread lifetime visualization component 428 can be any type of special purpose or programmed device in communication with the computer system over the bus or through a network connection.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating," "receiving," "parsing," "displaying," "passing," "sending," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable storage medium includes any mechanism for storing information in a form readable by a computer. For example, a computer readable storage medium includes read only memory ("ROM"), random access memory ("RAM"), magnetic disk storage media; optical storage media, flash memory devices or other type of machine-accessible storage media.

Thus, a method and apparatus for thread lifetime visualization has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method, comprising:
   receiving, by an integrated development environment component executed by a processing device, an output file generated by a thread tracking utility external to the integrated development environment, wherein the integrated development environment component comprises functions to interface the integrated development environment with the external thread tracking utility;
   generating, using the processing device, a visual representation of a life of a thread from the output file generated by the thread tracking utility external to the integrated development environment; and
   displaying, using the processing device, the generated visual representation to a requesting user.

2. The computer-implemented method of claim 1, further comprising:
   receiving a selection of a binary file and the thread tracking utility through the integrated development environment; and
   sending the binary file to the thread tracking utility.

3. The computer-implemented method of claim 1, wherein the integrated development environment component is a plug-in.

4. The computer-implemented method of claim 1, wherein the thread tracking utility is a Systemtap thread tracking utility.

5. The computer-implemented method of claim 1, wherein the integrated development environment (IDE) is an Eclipse IDE.

6. The computer-implemented method of claim 1, further comprising:
   parsing the output file into a data model; and
   passing the data model to a Gantt chart module.

7. The computer-implemented method of claim 1, further comprising:
   receiving the output file including thread tracking data for a plurality of threads; and
   parsing the output file into a data model for organizing lifetime data for each of the plurality of threads.

8. The computer-implemented method of claim 7, further comprising:
   displaying the lifetime data for each of the plurality of threads as a Gantt chart simultaneously.

9. A non-transitory computer-readable medium having instructions stored thereon, that when executed by a processing device, cause the processing device to perform operations comprising:
   receiving, by an integrated development environment component, an output file generated by a thread tracking utility external to the integrated development environment, wherein the integrated development environment component comprises functions to interface the integrated development environment with the external thread tracking utility;
   generating, using the processing device, a visual representation of a life of a thread from the output file generated by the thread tracking utility external to the integrated development environment; and
   displaying, using the processing device, the generated visual representation to a requesting user.

10. The non-transitory computer-readable medium of claim 9, the operations further comprising:
    receiving a selection of a binary file and the thread tracking utility through the integrated development environment; and
    sending the binary file to the thread tracking utility.

11. The non-transitory computer-readable medium of claim 9, wherein the integrated development environment component is a plug-in.

12. The non-transitory computer-readable medium of claim 9, wherein the thread tracking utility is a Systemtap thread tracking utility.

13. The non-transitory computer-readable medium of claim 9, wherein the integrated development environment (IDE) is an Eclipse IDE).

14. The non-transitory computer-readable medium of claim 9, the operations further comprising:
  parsing the output file into a data model; and
  passing the data model to a Gantt chart module.

15. The non-transitory computer-readable medium of claim 9, the operations further comprising:
  receiving the output file including thread tracking data for a plurality of threads; and
  parsing the output file into a data model for organizing lifetime data for each of the plurality of threads.

16. The non-transitory computer-readable medium of claim 15, the operations further comprising:
  displaying the lifetime data for each of the plurality of threads as a Gantt chart simultaneously.

17. A computer system comprising:
  a memory; and
  a processing device coupled to the memory to:
    receive, by an integrated development environment component, an output file generated by a thread tracking utility external to the integrated development environment, wherein the integrated development environment component comprises functions to interface the integrated development environment with the external thread tracking utility;
    generate automatically a visual representation of a life of a thread from the output file generated by the thread tracking utility external to the integrated development environment; and
    displaying the generated visual representation to a requesting user.

18. The computer system of claim 17, wherein the integrated development environment (IDE) is an Eclipse IDE.

19. The computer system of claim 17, wherein the thread monitoring utility is a Systemtap thread monitoring utility.

20. The computer system of claim 17, wherein the thread lifetime visualization plug-in sends a binary to the thread monitoring utility to execute and collect thread life data.

* * * * *